(12) United States Patent
Kelma (10) Patent No.: US 8,274,566 B2
(45) Date of Patent: Sep. 25, 2012

(54) MODULATION ANALYZER AND LEVEL MEASUREMENT DEVICE

(75) Inventor: David Kelma, Madisonville, TN (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 393 days.

(21) Appl. No.: 12/576,278

(22) Filed: Oct. 9, 2009

(65) Prior Publication Data

US 2011/0085045 A1    Apr. 14, 2011

(51) Int. Cl.
*H04N 17/00*    (2006.01)
*H04N 17/02*    (2006.01)

(52) U.S. Cl. ........ 348/180; 348/192; 348/194; 348/354; 348/356; 348/425; 348/500; 348/521; 348/725; 348/731

(58) Field of Classification Search .............. 348/180, 348/192, 194, 354, 356, 425, 500, 521, 725
See application file for complete search history.

(56) References Cited

U.S. PATENT DOCUMENTS

| | | |
|---|---|---|
| 3,790,909 A | 2/1974 | Le Fevre |
| 4,323,923 A * | 4/1982 | Reneau ............ 348/697 |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,961,218 A | 10/1990 | Kiko |
| 4,982,440 A | 1/1991 | Dufresne et al. |
| 5,010,399 A | 4/1991 | Goodman et al. |
| 5,126,840 A | 6/1992 | Dufresne et al. |
| 5,214,505 A | 5/1993 | Rabowsky et al. |
| 5,231,660 A | 7/1993 | West, Jr. |
| 5,369,642 A | 11/1994 | Shioka et al. |
| 5,548,255 A | 8/1996 | Spielman |
| 5,745,836 A | 4/1998 | Williams |
| 5,815,794 A | 9/1998 | Williams |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,970,053 A | 10/1999 | Schick et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |

(Continued)

FOREIGN PATENT DOCUMENTS

JP    55080989 A    6/1980
(Continued)

*Primary Examiner* — Jefferey Harold
*Assistant Examiner* — Mustafizur Rahman
(74) *Attorney, Agent, or Firm* — Schmeiser, Olsen & Watts LLP (57) ABSTRACT

A method is provided for determining a modulation of a CATV channel, the modulation being one of a digital modulation and an analog modulation. The method includes passing at least a portion of a tuner output from a tuner to a RF detector, and passing a RF detector output from the RF detector to a sync detector. The method further includes attenuating at least a portion of a sync detector output to create a remaining portion of the sync detector output, and passing the remaining portion of the sync detector output to a peak detector. The method further includes passing an output of the peak detector to a subsequent device, the output of the peak detector indicating whether the modulation of the CATV channel.

10 Claims, 8 Drawing Sheets

U.S. PATENT DOCUMENTS

| | | | |
|---|---|---|---|
| 6,167,187 A * | 12/2000 | Kazuma et al. | 386/279 |
| 6,205,138 B1 | 3/2001 | Nihal et al. | |
| 6,292,032 B1 * | 9/2001 | Hirabayashi et al. | 327/67 |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,495,998 B1 | 12/2002 | Terreault | |
| 6,496,221 B1 * | 12/2002 | Wolf et al. | 348/192 |
| 6,498,925 B1 | 12/2002 | Tauchi | |
| 6,510,152 B1 | 1/2003 | Gerszberg et al. | |
| 6,560,778 B1 | 5/2003 | Hasegawa | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,728,968 B1 | 4/2004 | Abe et al. | |
| 6,757,910 B1 | 6/2004 | Bianu | |
| 6,804,828 B1 | 10/2004 | Shibata | |
| 6,845,232 B2 | 1/2005 | Darabi | |
| 6,877,166 B1 | 4/2005 | Roeck et al. | |
| 6,928,175 B1 | 8/2005 | Bader et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,162,731 B2 | 1/2007 | Reidhead et al. | |
| 7,283,479 B2 | 10/2007 | Ljungdahl et al. | |
| 7,454,252 B2 | 11/2008 | El-Sayed | |
| 7,505,819 B2 | 3/2009 | El-Sayed | |
| 7,530,091 B2 | 5/2009 | Vaughan | |
| 2001/0016950 A1 | 8/2001 | Matsuura | |
| 2002/0141347 A1 | 10/2002 | Harp et al. | |
| 2002/0144292 A1 | 10/2002 | Uemura et al. | |
| 2002/0166124 A1 | 11/2002 | Gurantz et al. | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0183130 A1 | 8/2005 | Sadja et al. | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0205442 A1 | 9/2006 | Phillips et al. | |
| 2006/0282871 A1 | 12/2006 | Yo | |
| 2007/0288981 A1 | 12/2007 | Mitsuse et al. | |
| 2007/0288982 A1 | 12/2007 | Donahue | |
| 2008/0022344 A1 | 1/2008 | Riggsby | |
| 2008/0040764 A1 | 2/2008 | Weinstein et al. | |
| 2008/0127287 A1 | 5/2008 | Alkan et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2010/0329309 A1 * | 12/2010 | Tsui et al. | 375/130 |
| 2011/0032426 A1 * | 2/2011 | Huang | 348/558 |

FOREIGN PATENT DOCUMENTS

| | | |
|---|---|---|
| JP | 55132126 A | 10/1980 |
| JP | 57091055 A | 6/1982 |
| JP | 58101582 U | 6/1983 |
| JP | 05899913 | 7/1983 |
| JP | 61157035 A | 7/1986 |
| JP | 05191416 A | 7/1993 |
| JP | 07038580 A | 2/1995 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

* cited by examiner

MODULATION ANALYZER AND LEVEL MEASUREMENT DEVICE

FIELD OF THE INVENTION

The present invention relates generally to level measurement and comparison devices for use in community antenna television ("CATV") systems, and in particular to level measurement and comparison devices for use in CATV systems including content being passed using an analog modulation and content being passed using a digital modulation.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, digital signals, and/or optical signals) is passed from a supplier of the services to a user, and an upstream bandwidth (i.e., radio frequency ("RF") signals, digital signals, and/or optical signals) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher in frequency within the total bandwidth of the CATV system while the upstream bandwidth is, for example, signals that are relatively lower in frequency.

Traditionally, the CATV system includes a head end facility, where the downstream bandwidth is initiated into a main CATV distribution system, which typically includes a plurality of trunk lines, each serving at least one local distribution network. In turn, the downstream bandwidth is passed to a relatively small number (e.g., approximately 100 to 500) of users associated with a particular local distribution network. Devices, such as high-pass filters, are positioned at various points within the CATV system to ensure the orderly flow of downstream bandwidth from the head end facility, through the trunk lines, through the local distribution networks, and ultimately to the users.

At various locations between the head end facility and the user, there are amplifiers and slope adjustment devices for the purpose of maintaining the quality of the downstream bandwidth. This statement introduces three terms (i.e., quality, amplifiers, and slope adjustment devices) that are important to the remaining discussion. These will be discussed broadly below.

The quality of the downstream bandwidth is often a measure of: (i) a signal level of a particular channel within the downstream bandwidth, the signal level referred to merely as "level;" and (ii) a general consistency of levels across all of the channels in the downstream bandwidth, the general consistency referred to as "slope." These objective measurements are often used by technicians to evaluate CATV system performance during operation and to troubleshoot customer complaints.

The level of each channel should fall within a specific range that has been determined to provide satisfactory video, sound and information transfer rates for users. The specific requirements for each channel are not of importance to the present discussion, but it is helpful to understand that there are specific targets for the level of each channel. Note that this is a simplistic definition to explain "level," and note that this definition does not include other variances such as between analog and digital.

Slope is a measurement used to assess the amount of loss experienced due in large part to cable length. While all channels experience some loss, channels transmitted using higher frequencies within the downstream bandwidth experience more loss than those transmitted using lower frequencies. Accordingly, when the levels for all of the channels within the downstream bandwidth are graphed such that they are arranged in order according to the frequency of the channel, there may be a significant visual downward slope in the graph from the lowest frequency channel to highest frequency channel. This downward slope becomes more prominent as the length of signal cable increases. Note that this is a simplistic definition to explain the consistency of levels across all of the channels and the "slope" that is created by losses occurring in the signal cables. Also note that this definition does not include other variances such as between analog and digital.

For at least the forgoing reasons, a need is apparent for a device, which can accurately measure the level of channels present in the downstream bandwidth and accurately compare these measurements to determine whether amplification is required and whether slope adjustment is required.

SUMMARY OF THE INVENTION

The present invention helps to increase the quality of the downstream bandwidth. Increasing the quality of the downstream bandwidth improves customer satisfaction and reduces expenditures relating to customer complaints.

In accordance with one embodiment of the present invention, a modulation analyzer and level measurement device is provided for use with a CATV system. The device includes, a tuner, a band pass filter connected electrically downstream the tuner, and an RF detector connected electrically downstream the band pass filter. The device further includes a sync detector connected electrically downstream the RF detector, and a peak detector connected electrically downstream the sync detector.

In accordance with one embodiment of the present invention, a method is provided for determining a modulation of a CATV channel. The modulation being one of a digital modulation and an analog modulation. The method includes passing at least a portion of a tuner output from a tuner to a RF detector, and passing a RF detector output from the RF detector to a sync detector. The method further includes attenuating at least a portion of a sync detector output to create a remaining portion of the sync detector output, and passing the remaining portion of the sync detector output to a peak detector. The method further includes passing an output of the peak detector to a subsequent device, the output of the peak detector indicating whether the modulation of the CATV channel.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION

Figure 1:
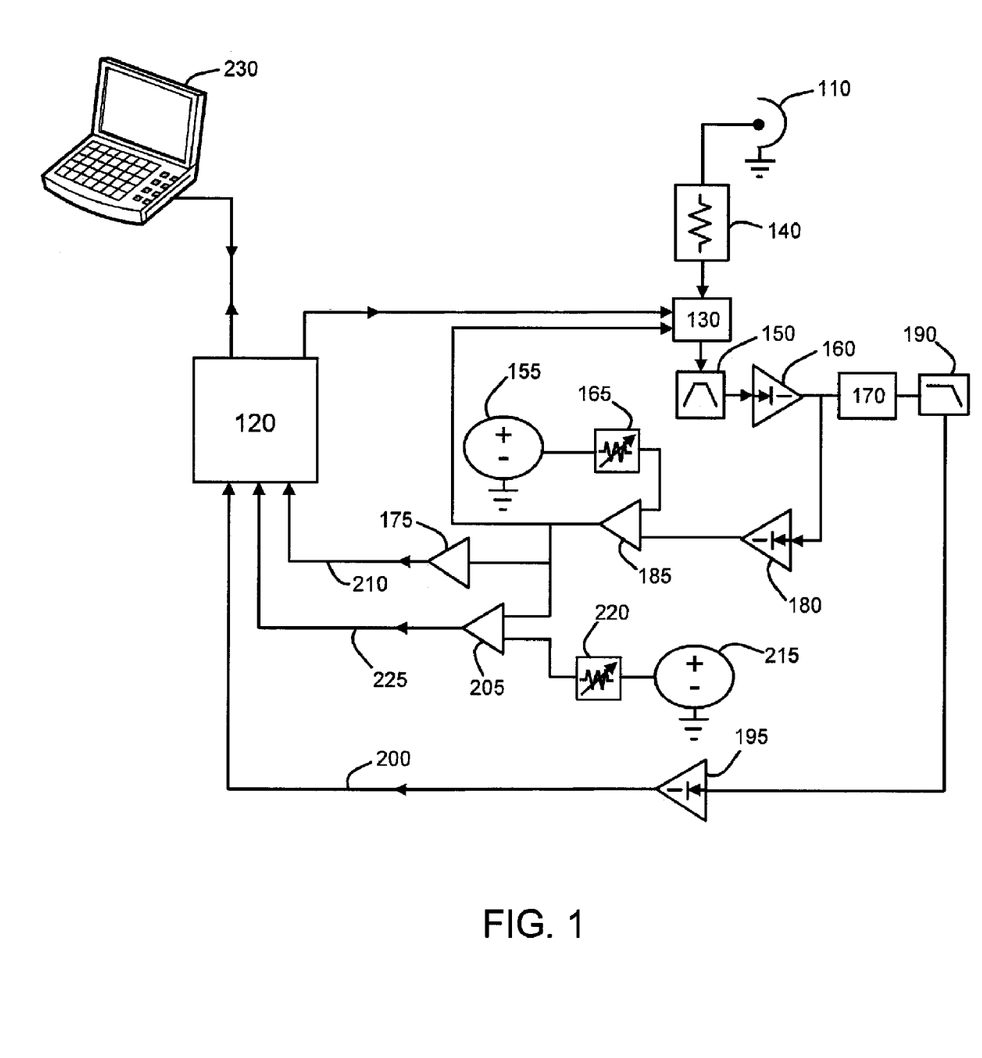
FIG. 1 is a circuit diagram representing a downstream device including a downstream section made in accordance with one embodiment of the present invention.

Referring to FIG. 1, a measurement device 100 may include an RF connector 110, which may be any of the connectors used in the art for connecting a signal cable to a device. For example, the RF connector 110 may be a traditional "F-type" connector.

The term "connected" is used throughout to mean optically or electrically positioned such that current, voltages, and/or light are passed between the connected components. It should be understood that the term "connected" does not exclude the possibility of intervening components or devices between the connected components. For example, the tuner 130 is connected to the RF connector 110 even though a fixed signal level adjustment device 140 is shown to be positioned in an intervening relation between the tuner 130 and the RF connector 110.

The fixed signal level adjustment device 140 may be positioned between the RF connector 110 and the tuner 130. The fixed signal level adjustment device 140 may be used to prevent the RF connector 110 from drawing too much power from a connected source. Further, the fixed signal level adjustment device 110 may be sized to provide the tuner 130 with the coupled downstream bandwidth having an appropriate amount of power for the tuner 130 and subsequent devices. Accordingly, one skilled in the art would understand, based on the present disclosure, whether the fixed signal level adjustment device 140 is required and what size of the fixed signal level adjustment device 140 is required for any particular RF connector 110 and tuner 130 combinations.

The tuner 130 is a traditional tuner device that can be "tuned" to selected channels based on an input from a microprocessor 120. In particular the tuner 130 used in the present embodiment is provided with a target index number (Index #) that corresponds with CATV channels, as shown below in Table 1. The purpose for pointing out these index numbers is to show that CATV channels have not been introduced in an orderly fashion. For example, CATV channel 95 (Index # 5) is lower in frequency than CATV channel 14 (Index #10). Accordingly, the present microprocessor 120 controls the tuner 130 based on an index number that increments in ascending order along with the frequencies that the index number represents. If a more powerful microprocessor and/or a more complex software control are used, the index of channels, shown below, may not be necessary.

TABLE 1

| Index # | Channel Designator | Channel Bandwidth | |
|---|---|---|---|
| | | Low end | High End |
| 0 | 2 | 54 | 60 |
| 1 | 3 | 60 | 66 |
| 2 | 4 | 66 | 72 |
| 3 | 5 | 76 | 82 |
| 4 | 6 | 82 | 88 |
| 5 | A-5 (95) | 90 | 96 |
| 6 | A-4 (96) | 96 | 102 |
| 7 | A-3 (97) | 102 | 108 |
| 8 | A-2 (96) | 108 | 114 |
| 9 | A-1 (99) | 114 | 120 |
| 10 | A (14) | 120 | 126 |
| 11 | B (15) | 126 | 132 |
| 12 | C (16) | 132 | 138 |
| 13 | D (17) | 138 | 144 |
| 14 | E (18) | 144 | 150 |
| 15 | F (19) | 150 | 156 |
| 16 | G (20) | 156 | 162 |
| ~ . . . | ~ . . . | ~ . . . | ~ . . . |
| 94 | C91 | 624 | 630 |
| 95 | C92 | 630 | 636 |
| 96 | C93 | 636 | 642 |
| 97 | C94 | 642 | 648 |
| 98 | C100 | 648 | 654 |
| 99 | C101 | 654 | 660 |
| 100 | C102 | 660 | 666 |
| 101 | C103 | 666 | 672 |
| 102 | C104 | 672 | 678 |
| 103 | C105 | 678 | 684 |
| 104 | C106 | 684 | 690 |
| 105 | C107 | 690 | 696 |
| 106 | C108 | 696 | 702 |
| 107 | C109 | 702 | 708 |
| 108 | C110 | 708 | 714 |
| 109 | C111 | 714 | 720 |
| ~ . . . | ~ . . . | ~ . . . | ~ . . . |

The term "microprocessor" used throughout should be understood to include all active circuits capable of performing the functions discussed herein. For example, the microprocessor 120 may be replaced with a microcontroller, a system specific digital controller, or a complex analog circuit.

Figure 2:
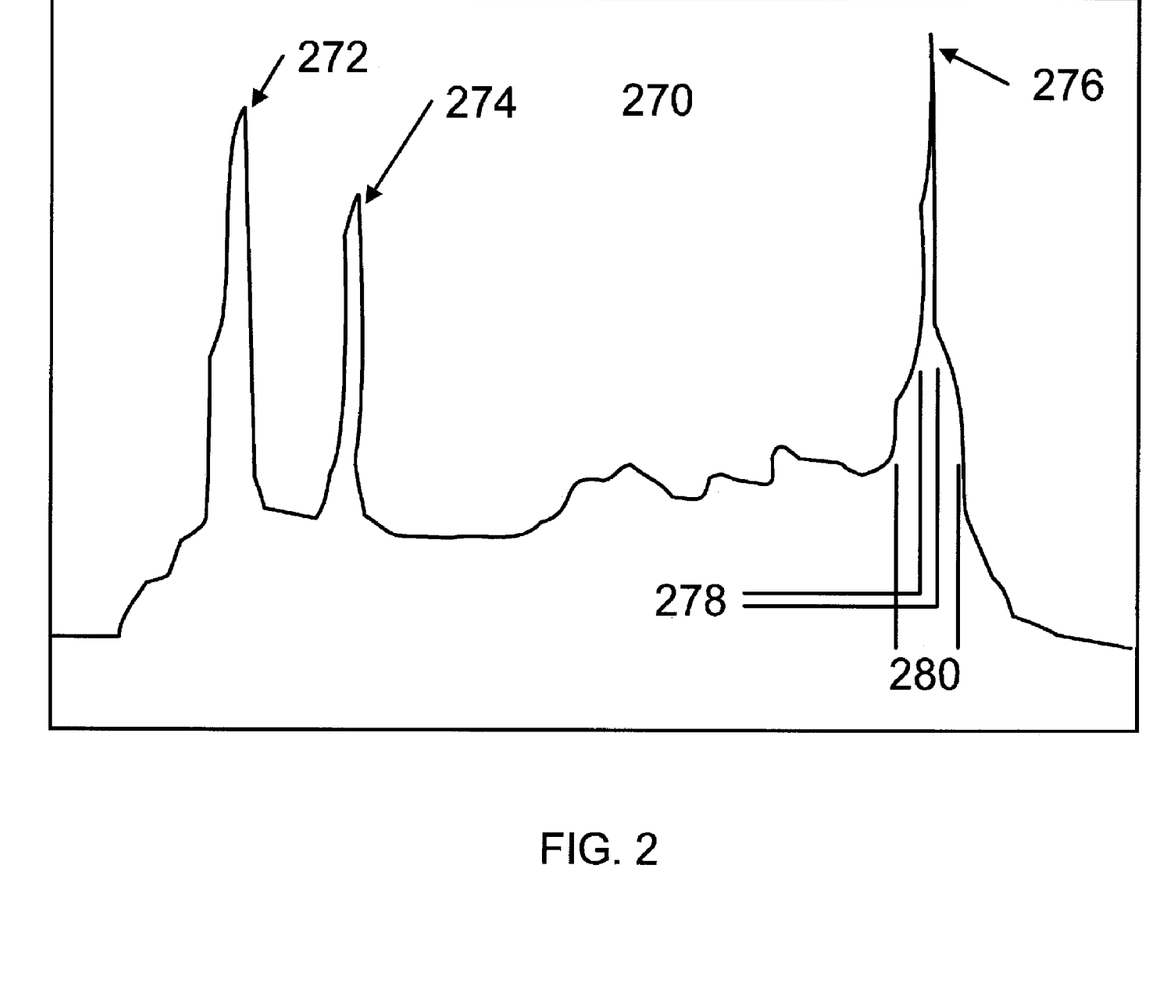
FIG. 2 is a representation of a frequency domain voltage stream of a channel having an analog modulation.
Figure 3:
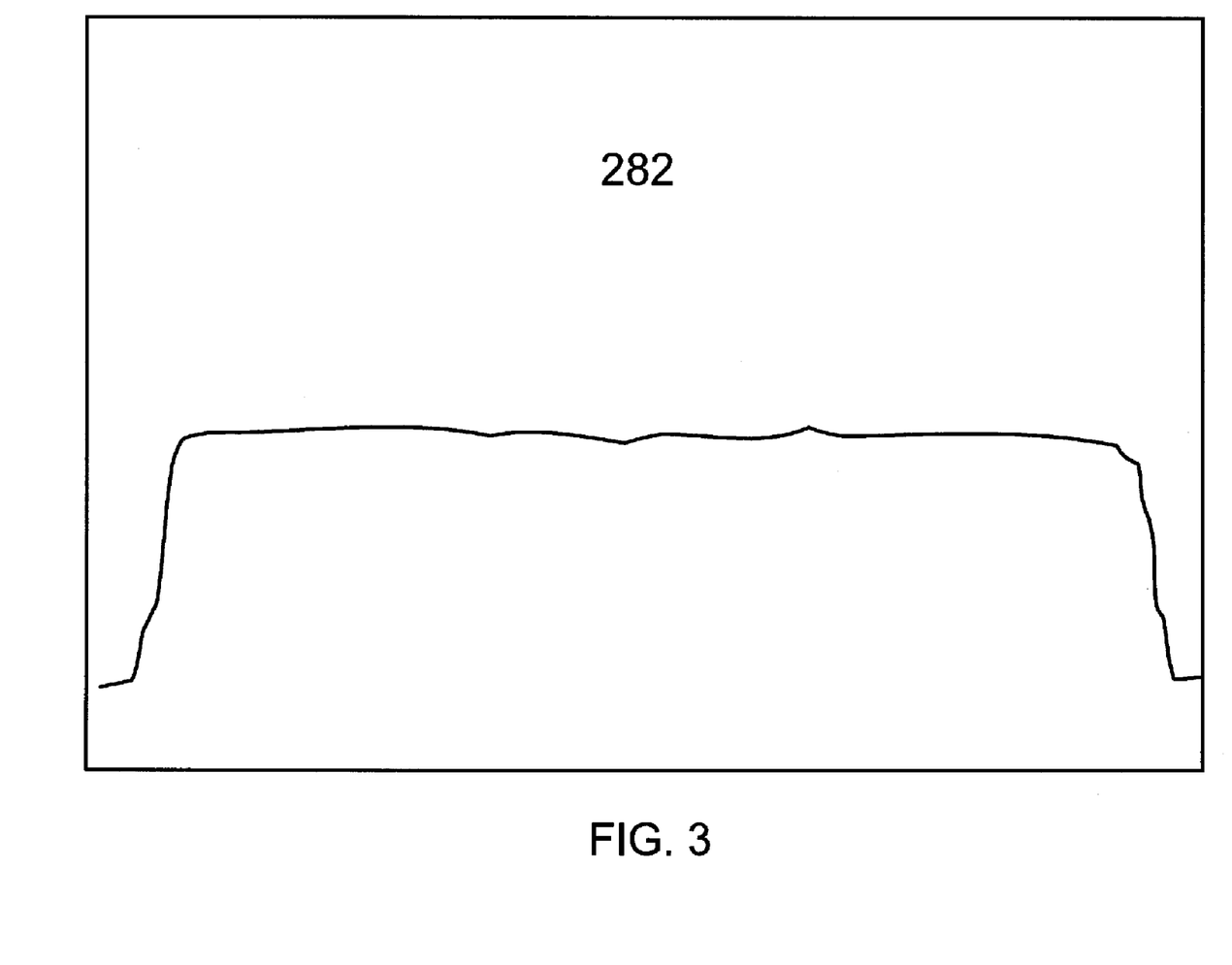
FIG. 3 is a representation of a frequency domain voltage stream of a channel having a digital modulation.

The output voltage stream from the tuner 130 is typical of tuners in that the voltage stream is a single channel output spectrum voltage stream, which in the case of NTSC is 6 MHz. If the output voltage stream from the tuner 415 is an analog modulation, the spectrum will likely appear as shown in FIG. 2, which will be described in further detail below. If the output voltage stream from the tuner 415 is a digital modulation, the modulation will likely appear as shown in FIG. 3.

Referring FIG. 2, an analog modulation spectrum 270 includes, in relevant part, a sound subcarrier 272 ("SOX 272"), a color subcarrier 274 ("CLX 274"), and a picture subcarrier 276 ("PIX 276"). Note that other parts or subcarriers may be present or may be missing from the single channel output spectrum voltage stream, as various signal formats are different in accordance with differing standards. As is shown in FIG. 2, a total integrated power in the analog modulation spectrum 270 is not evenly distributed. Rather, the PIX 276 represents approximately 50% of the total power in the analog modulation spectrum 270. Further, the integrated power between the PIX 276 and the CLX 274 varies with the content of any picture being output from the tuner 130. However, a vertical synchronization portion 278 ("vertical sync 278") and a horizontal synchronization portion 280 ("horizontal sync 280") of the analog modulation spectrum 270 are located very near the PIX 276 and remain at a nearly constant power level. The SOX 272, typically transmitted at −15 dBc (decibels below carrier) also remains at a nearly constant power level because it is frequency modulated. The lowest powered subcarrier is the CLX 274, typically transmitted at −20 dBc, also remains at a nearly constant power level because it is phase modulated. Based on these ratios, the CLX 274 represents approximately 1% of the total power, and the SOX represents approximately 4.5% of the total power.

Figure 4:
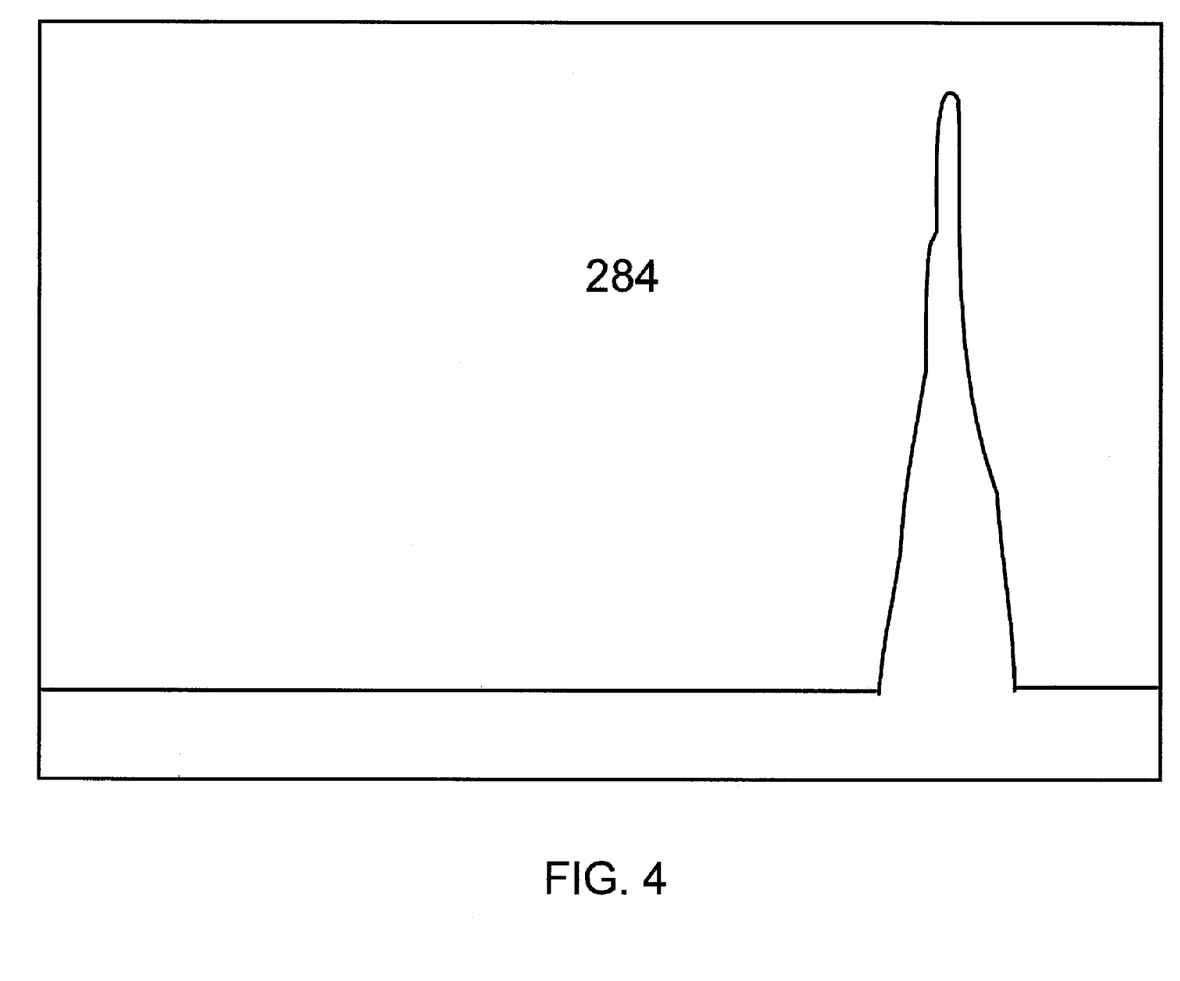
FIG. 4 is a representation of a voltage stream output (analog) from a band-pass filter arranged in accordance with an embodiment of the present invention.

Referring now to FIG. 4, a digital modulation spectrum 282 has an evenly distributed integrated power transmitted at −10 dBc from an equivalent analog modulated carrier.

Referring back to FIG. 1, a relatively narrow band-pass filter 150 may be electrically connected to an output of the tuner 130. The band-pass filter 150 removes extraneous signals above and below desired frequencies, which in the present embodiment is the PIX 276 (FIG. 2) provided by the tuner 130. Alternatively, the band-pass filter 150 may be replaced by a narrow low-pass filter, as the vertical synchronization frequency is modulated low within the range of frequencies in accordance with NTSC. Similarly, the band-pass filter 150 may be replaced by a high-pass filter that removes extraneous signals below other desired frequencies provided by the tuner, such as the horizontal synchronization frequency. It should be understood that differing frequencies may need to be selected depending on the analog modulation scheme expected. A resulting frequency domain voltage stream is then passed to an RF detector 160.

Figure 5:
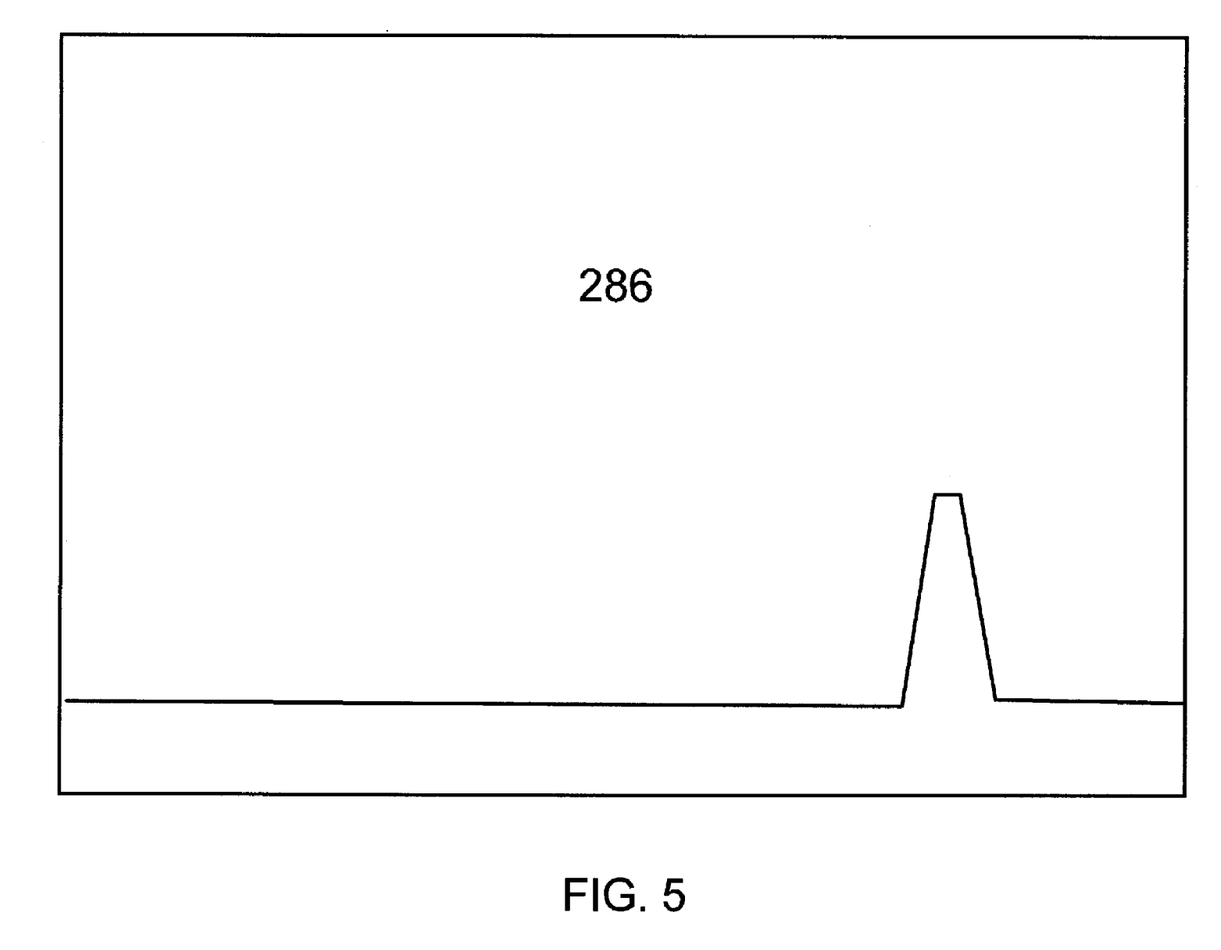
FIG. 5 is a representation of a voltage stream output (digital) from a band-pass filter arranged in accordance with an embodiment of the present invention.

A resulting frequency domain voltage stream 284 ("analog voltage stream 284") (FIG. 4) is expected to pass from the band-pass filter 150 when the analog modulation spectrum 270 is provided by the tuner 130, and a resulting frequency domain voltage stream 286 ("digital voltage stream 286") (FIG. 5) is expected to pass from the band-pass filter 150 when the digital modulation spectrum 282 is provided by the tuner 130. While there is a significant power difference between the analog voltage stream 284 and the digital voltage stream 286, this difference may not be sufficient to accurately discriminate between the analog voltage stream 284 and digital voltage stream 286, especially because the incoming signal level of the individual channels may vary greatly. Accordingly, additional means, discussed more fully below, are provided to discriminate between the analog voltage stream 284 and digital voltage stream 286.

Figure 6:
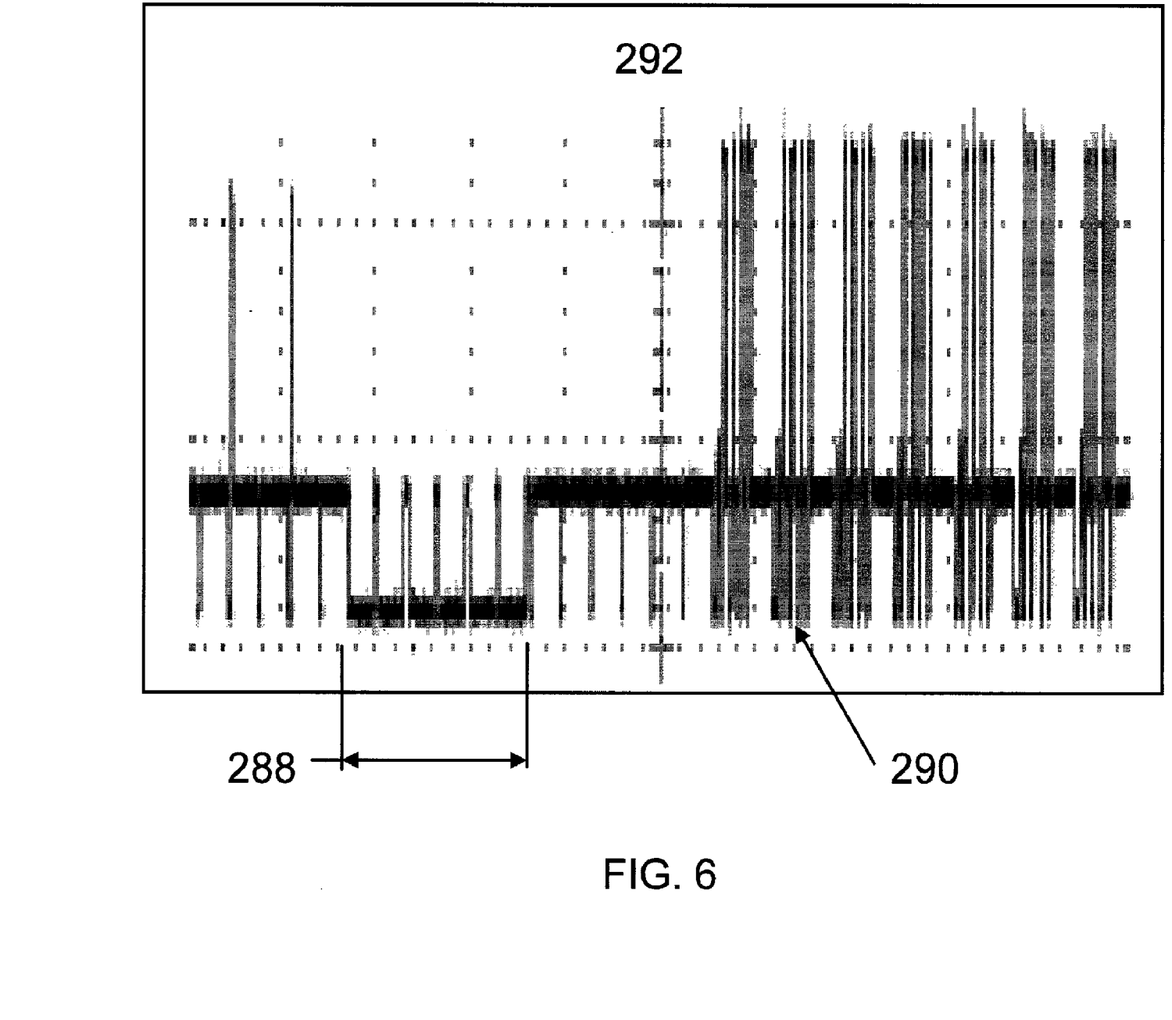
FIG. 6 is a representation of a time domain voltage stream (analog) from a RF detector arranged in accordance with one embodiment of the present invention.
Figure 7:
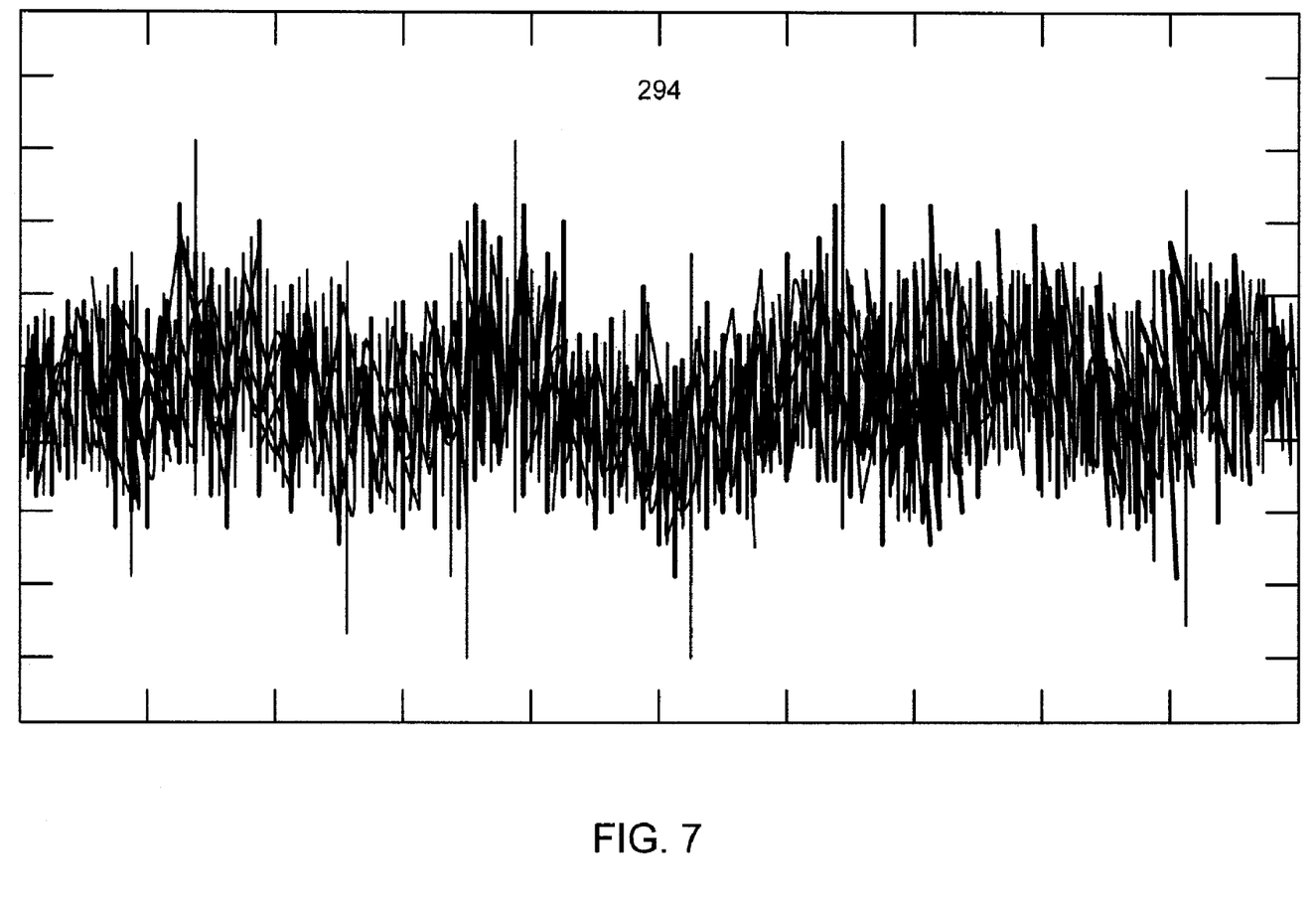
FIG. 7 is a representation of a time domain voltage stream (digital) from a RF detector arranged in accordance with one embodiment of the present invention.

The RF detector 160 converts the frequency domain voltage stream passed from the band-pass filter 150 into a time domain voltage stream (analog) 292 (FIG. 6) or (digital) 294 (FIG. 7). More specifically, the RF detector 160 performs the effect of an inverse Laplace, the Laplace transform being a widely used integral transform, to convert the portion of the downstream bandwidth from a frequency domain voltage stream into a time domain voltage stream. The inverse Laplace transform is a complex integral, which is known by various names, the Bromwich integral, the Fourier-Mellin integral, and Mellin's inverse formula. An alternative formula for the inverse Laplace transform is given by Post's inversion formula. Accordingly, any other device capable of such a conversion from the frequency domain to the time domain may be used in place of the RF detector 160. Afterward, the time domain voltage stream 292, 294 is passed to both a synchronization detector 170 ("sync detector 170") and a low frequency level detector 180.

The time domain voltage stream 292, 294 differs depending on whether the frequency domain voltage stream is the analog voltage stream 284 or the digital voltage stream 286. For example, FIG. 6 is a typical baseline time domain signal voltage stream (analog) 292 from the RF detector 160 when the analog voltage stream 284 is passed to the RF detector 160. As shown in FIG. 6, a very large portion of the time domain voltage stream (analog) includes vertical synchronization pulses 288 and horizontal synchronization pulses 290. Accordingly, the time domain voltage stream (analog) 292 relative to the analog voltage stream 284 includes distinct and large components that have specific time periods.

The voltage stream represented in FIG. 7 is the typical baseline time domain voltage stream (digital) 294 from the RF detector 160 when the digital voltage stream 286 is passed to the RF detector 160. As shown in FIG. 7, the time domain voltage stream (digital) 294 includes none of the distinctive attributes present in the time domain voltage stream (analog) 292, such as components having specific time period and specific amplitude relationships.

Figure 8:
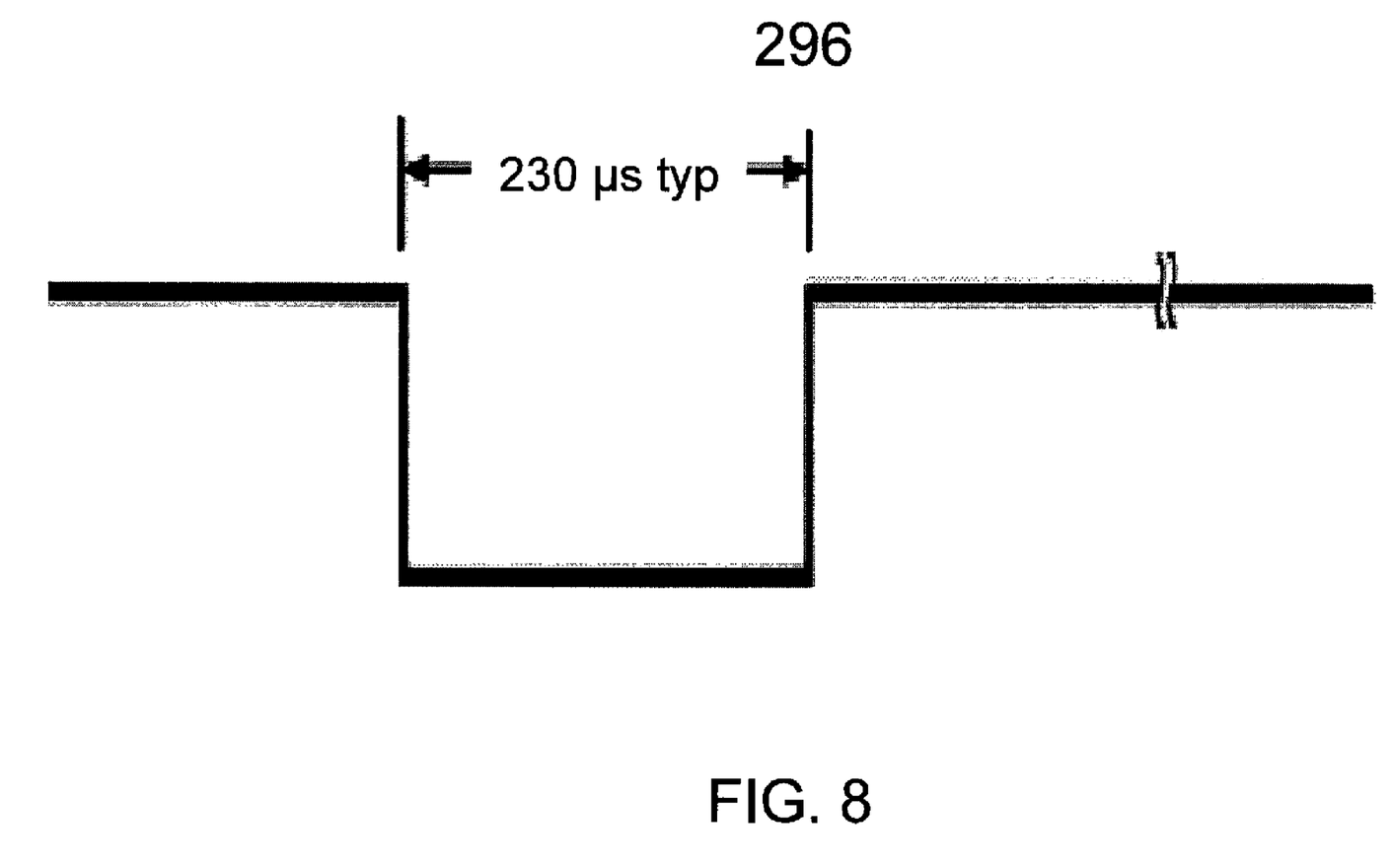
FIG. 8 is a representation of a voltage stream (analog) from a sync detector arranged in accordance with one embodiment of the present invention.

The sync detector 170 attempts to extract timing information from the time domain voltage stream 292, 294. For example, with the time domain voltage stream (analog) 292 (generated from the analog voltage stream 284) the sync detector 170 extracts the vertical sync 278 and the horizontal sync 280, and the sync detector 170 provides a sync detector voltage stream (analog) 296 represented in FIG. 8. In the present embodiment, the sync detector voltage stream (analog) 296 has a period of 16.8 milliseconds and a duty cycle of 1.37%. Further, the sync detector output 296 results in a fundamental frequency of 59.5 Hz with harmonics starting above 4300 Hz, which means that a significant amount of energy resides in the fundamental frequency of 59.5 Hz. These values are optimal, but other values are possible.

In contrast to the sync detector voltage stream (analog) 296, a sync detector voltage stream (digital) from the sync detector 170 is either high or low and randomly flips back and forth at a rate of less than 5 seconds, in the present embodiment, when the digital voltage stream 286 is passed into the sync detector 170. More specifically, the energy present in the sync detector voltage stream (digital) resulting from the digital voltage stream 286 is randomly distributed among the frequencies that are well below 0.2 Hz. Accordingly, the sync detector 170 generates a significant amount of time domain separation between the sync detector voltage stream (analog) 296 and the sync detector voltage stream (digital) in the output of the sync detector 170.

The sync detector output (either analog or digital) is then passed to a low-pass filter 190. The low-pass filter 190 is provided having a low frequency zero caused by an input blocking capacitor. This arrangement removes frequencies well below 59.5 Hz and frequencies above 300 Hz leaving only the fundamental vertical sync frequencies. Accordingly, when the sync detector 170 provides the sync detector voltage stream (digital), the low-pass filter 190 passes essentially no energy to a peak detector 195 connected electrically downstream the sync detector 170. These values are optimal, but other values are possible.

The peak detector 195 produces a relatively consistent voltage stream when the sync detector 170 and the low-pass filter 190 provide a voltage stream including synchronous voltages. In the presence of a voltage stream including random, non-synchronous voltages, which is the case in the presence of the sync detector voltage stream (digital), the peak detector 195 is unable to produce a voltage steam that is consistently a significant voltage above ground. Accordingly, the peak detector 195 remains in a low logic state in the presence of the sync detector voltage stream (digital). Alternatively, when portions of the sync detector voltage stream (analog) 296 are passed from the low-pass filter 190, the peak detector 195 sees significant amounts of energy, and the peak detector 195 changes to a high logic state. The peak detector 195 may also be referred to as a level detector and/or an integrator performing a similar function.

A resulting voltage stream from the peak detector 195 is input along a path 200 into the microprocessor 120 as a signal that discriminates between analog modulation channels and digital modulation channels. More specifically, the voltage stream from the peak detector 195 indicates that the tuner 130 is tuned to an analog modulation channel when the voltage stream is consistently a significant voltage above ground. Conversely, the voltage stream from the peak detector 195 indicates that the tuner 130 is tuned to a digital modulation channel when the voltage steam is consistently near ground. Alternatively, the peak detector 195 may be an inverting peak detector. When such an inverting peak detector is used, the voltage stream would be a significant voltage below the power supply rail when the tuner 130 is tuned to an analog modulation channel.

As mentioned above, the voltage stream from the RF detector 160 is also passed to the low frequency level detector 180 and an integration capacitor (not shown) connected electrically between the low frequency level detector 180 and a DC shift amplifier 185. The low frequency level detector 180 and integration capacitor are used to integrate the total power of the voltage stream coming out of the RF detector 160. For example, a digital modulation is −10 dBc in relation to the analog PIX 276, the power in the two types of modulations (analog and digital) is equal. Accordingly, the detected voltage at the integration capacitor is similar between the two types of modulations (i.e., analog and digital). The voltage stream from the low frequency level detector 180 and integration capacitor is then input into the DC shift amplifier 185. The low frequency level detector 180 may also be known as a peak detector.

The DC shift amplifier 185 may be used as a low pass amplifier to provide a voltage stream that has been shifted in scale by a known amount to render the signal voltages appropriate for the microprocessor 120. The amount of voltage shift and/or amplification is determined by a voltage source 155 connected to the DC shift amplifier 185 by an adjustable attenuator 165. Accordingly, the DC shift amplifier 185 may also be known as a low-pass amplifier. A portion of the voltage stream from the DC shift amplifier 185 is passed back to an automatic gain control input of the tuner 130 that adjusts a total system gain. This voltage stream holds the tuner output at a constant level. Additionally, a portion of the voltage stream from the DC shift amplifier 185 is passed to a high-gain amplifier 175, and a portion of the voltage stream from the DC shift amplifier 185 is passed to a low-gain amplifier 205.

The high-gain amplifier 175 is provided with the voltage stream from the DC shift amplifier 185 to function as a voltage comparator. For example, if any DC voltage shift is sensed at the output of the integration capacitor, from a DC voltage representing no input signal to the tuner, the high-gain amplifier 175 saturates and stays at a low side voltage power supply rail. Accordingly, this arrangement effectively makes a digital output that is high when there is no signal or channel, and low when there is any signal or channel. This arrangement provides a voltage stream in a path 210 to the microprocessor 120 to identify the occurrence of a transmitted channel present at the Index # tuned by the tuner 130. Alternatively, the high-gain amplifier 175 may be inverting high-gain amplifier. When an inverting high-gain amplifier is used, the voltage stream would low when there is no signal or channel, and high when there is any signal or channel.

The low-gain amplifier 205 is also provided with the voltage stream from the DC shift amplifier 185. The low-gain amplifier 205 is shifted in response to the voltage source 215, which is connected to the low-gain amplifier 205 via an adjustable attenuator 220. The gain of low-gain amplifier 205 is only large enough to cause the low-gain amplifier 205 to reach a positive voltage rail when an input voltage stream is at a high end of the allowable range of the input voltage stream. The resulting voltage stream from the low-gain amplifier 205 is relative to the level of the channel at the tuned index and is sufficient for the provision of the relative level to the microprocessor 310. Further, the low-gain amplifier 205 scales the level of the channel at the tuned index for maximum resolution with respect to the microprocessor 120. The voltage source 215 is used to calibrate a range of the low-gain amplifier 205 through adjustment of the adjustable attenuator 220. Accordingly, the voltage stream provided in a path 225 to the microprocessor 120 is used to identify the level of a transmitted channel present at the Index # tuned by the tuner 120.

The measurement device 100 may first be calibrated to provide a more accurate output to a laptop computer 230 or other output device. The calibration is accomplished by attaching the measurement device 100 to a matrix generator, which provides the measurement device 100 with at least two known levels, such as 0 dBmV and 20 dBmV, at every index number. The calibration sequence proceeds with the tuner 130 incrementing through each index number (from the chart provided above) and obtaining a calibration level for each index number. In the present embodiment, this calibration level is saved as a digital value between 0 and 255. The following is a chart of sample calibration levels, the values being chosen for exemplary purposes only:

TABLE 2

| | | Calibration Level | |
| --- | --- | --- | --- |
| Index # | Channel Designator | Low end 0 dBmV | High End 20 dBmV |
| 0 | 2 | 155 | 210 |
| 1 | 3 | 165 | 225 |
| 2 | 4 | 155 | 218 |
| 3 | 5 | 160 | 223 |
| 4 | 6 | 155 | 214 |
| 5 | A-5 (95) | 148 | 205 |
| 6 | A-4 (96) | 168 | 224 |
| 7 | A-3 (97) | 168 | 231 |
| 8 | A-2 (96) | 159 | 217 |
| 9 | A-1 (99) | 163 | 224 |
| 10 | A (14) | 168 | 226 |
| 11 | B (15) | 150 | 213 |
| 12 | C (16) | 163 | 226 |
| 13 | D (17) | 167 | 224 |
| 14 | E (18) | 167 | 228 |
| 15 | F (19) | 161 | 224 |
| 16 | G (20) | 149 | 220 |
| ~... | ~... | ~... | ~... |
| 94 | C91 | 163 | 231 |
| 95 | C92 | 166 | 220 |
| 96 | C93 | 162 | 219 |
| 97 | C94 | 148 | 208 |
| 98 | C100 | 175 | 218 |
| 99 | C101 | 162 | 212 |
| 100 | C102 | 163 | 211 |
| 101 | C103 | 172 | 235 |
| 102 | C104 | 172 | 231 |
| 103 | C105 | 158 | 202 |
| 104 | C106 | 162 | 218 |
| 105 | C107 | 151 | 209 |
| 106 | C108 | 161 | 217 |
| 107 | C109 | 163 | 213 |
| 108 | C110 | 168 | 215 |
| 109 | C111 | 159 | 216 |
| ~... | ~... | ~... | ~... |

Even though two calibration values are shown below for each channel, it is possible to use only one calibration value for each, with at least one assumption. For example, one calibration value only may be used if/when an assumed increment is used for voltage changes.

After the measurement device 100 is calibrated for use, the measurement device 100 may be attached at any location within a CATV system. The use and control of the measurement device may take a variety of different forms, a few of which will be outlined below.

One such use includes a technician entering a particular Index # or other channel identifier into the laptop computer 230 (or any other handheld or larger device). The measurement device 100 then provides channel information to the technician. This channel information may include: (i) whether a channel is present; (ii) whether the channel is being received in an analog or digital modulation, and (iii) the level of the channel being received. The technician may choose to review the provided information on a display screen and then act upon the information to attach and/or adjust signal conditioning equipment. The provided information may also be saved to a computer readable medium for review, data analysis and action such as the issuance of control system operational instructions based on the information, at a later date or on a more system wide basis.

Another such use includes a technician running a routine that samples channels at predetermined positions across the CATV transmission spectrum. In this example, the measurement device 100 may provide channel information relating to groups of channels for the purpose of making comparisons between the channels. As with above, this channel information may include: (i) whether the selected channels are present; (ii) whether the selected channels are being received in an analog or digital modulation, and (iii) the level of each channel being received. The technician may choose to review the provided information on a display screen and then act upon the information to attach and/or adjust signal conditioning equipment. The provided information may also be saved to a computer readable medium for review, data analysis and action such as the issuance of control system operational instructions based on the information, at a later date or on a more system wide basis.

Another such use includes incorporating the measurement device into a downstream bandwidth conditioning device that is used to condition the downstream bandwidth in terms of level and slope. Within such a device, the microprocessor 120 may increment the tuner 130 through at least two channels to determine an appropriate amount of level and slope adjustment to apply as part of the conditioning process.

While not explicitly shown in FIG. 1, the measurement device 100 may be remotely mounted from the laptop computer 230 (or any other handheld or larger device), such that the information provided to and from the microprocessor 120 is transmitted by any one of the know information transmission technologies, including, but certainly not limited to, DOCSIS, TCP/IP, RS232, and 802.11. Along these lines, it is envisaged that a plurality of measurement devices 100 may by placed at various locations around a CATV systems while being accessed by a single laptop computer 230 or other remote storage device, enabling individual user, group and broader system-wide analysis of operational parameters. It is envisaged that such analysis may lead to observation and the postulation of control instructions to optimize system operation for an individual user or group of cable subscribers.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A modulation analyzer and level measurement device for use with a CATV system, the device comprising:
a tuner;
a band pass filter directly connected to the tuner, wherein the band pass filter is connected electrically downstream from the tuner;
an RF detector directly connected to the band pass filter, wherein the band pass filter is connected electrically downstream from the band pass filter, and wherein the RF detector is configured to convert a frequency domain voltage stream to a time domain voltage stream;
a sync detector directly connected to the RF detector, wherein the sync detector is connected electrically downstream from the RF detector, and wherein the sync detector is configured to receive the time domain voltage stream and extract timing information from the time domain voltage stream; and
a peak detector connected electrically downstream the sync detector, wherein the peak detector is configured to generate a consistent voltage stream when the sync detector provides a voltage stream comprising synchronous voltages.

2. The device of claim 1 further comprising:
a low frequency level detector connected electrically downstream the band pass filter;
a DC shift amplifier connected electrically downstream the low frequency amplifier; and
a high gain amplifier connected electrically downstream the DC shift amplifier.

3. The device of claim 1 further comprising:
a low frequency level detector connected electrically downstream the band pass filter;
a DC shift amplifier connected electrically downstream the low frequency amplifier; and
a low-gain amplifier connected electrically downstream the DC shift amplifier.

4. The device of claim 2 further comprising a low-gain amplifier connected electrically downstream the DC shift amplifier.

5. The device of claim 1 further comprising a low pass filter connected electrically between the sync detector and the peak detector.

6. The device of claim 2 further comprising a first voltage source connected to the DC shift amplifier.

7. The device of claim 3 further comprising a second voltage source connected to the low-gain amplifier.

8. The device of claim 4 further comprising a microprocessor connected electrically downstream each of the DC shift amplifier, low-gain amplifier, and the peak detector.

9. A method for determining a modulation of a CATV channel, the modulation being one of a digital modulation and an analog modulation, the method comprising:
passing at least a portion of a tuner output from a tuner, through a band pass filter, to a RF detector, wherein the band pass filter directly connected between the tuner and the RF detector;
generating, by the RF detector, a RF detector output by converting a frequency domain voltage stream to a time domain voltage stream;
passing the RF detector output from the RF detector to a sync detector directly connected to the RF detector;

extracting, by the sync detector, timing information from the time domain voltage stream;

attenuating at least a portion of a sync detector output to create a remaining portion of the sync detector output;

passing the remaining portion of the sync detector output to a peak detector;

generating, by the peak detector, a consistent voltage stream when the sync detector provides a voltage stream comprising synchronous voltages; and passing an output of the peak detector to a subsequent device, the output of the peak detector indicating whether the modulation of the CATV channel.

10. The device of claim 1 further comprising a fixed signal level adjustment device may connected between an RF connector and the tuner, wherein the fixed signal level adjustment device is configured to prevent the RF connector from drawing too much power from a connected source, and wherein the fixed signal level adjustment device is further configured to be sized to provide the tuner with a coupled downstream bandwidth comprising a specified amount of power for the tuner.

* * * * *